(12) United States Patent
Landolt et al.

(10) Patent No.: US 10,752,394 B2
(45) Date of Patent: Aug. 25, 2020

(54) PACKAGING APPARATUS COMPRISING ACTUATOR AND METHOD OF OPERATING PACKAGING APPARATUS

(71) Applicant: CRYOVAC, INC., Duncan, SC (US)

(72) Inventors: Stefan Landolt, Obernau (CH); Josef Schumacher, Udligenswil (CH)

(73) Assignee: Cryovac, LLC, Charlotte, NC (US)

( * ) Notice: Subject to any disclaimer, the term of this patent is extended or adjusted under 35 U.S.C. 154(b) by 455 days.

(21) Appl. No.: 14/907,402

(22) PCT Filed: Jul. 23, 2014

(86) PCT No.: PCT/EP2014/065845
§ 371 (c)(1),
(2) Date: Jan. 25, 2016

(87) PCT Pub. No.: WO2015/011202
PCT Pub. Date: Jan. 29, 2015

(65) Prior Publication Data
US 2016/0251102 A1     Sep. 1, 2016

(30) Foreign Application Priority Data

Jul. 23, 2013   (EP) .................................. 13177586

(51) Int. Cl.
*B65B 59/00*     (2006.01)
*B65B 65/02*     (2006.01)
(Continued)

(52) U.S. Cl.
CPC ............ *B65B 65/02* (2013.01); *B65B 31/024* (2013.01); *B65B 35/10* (2013.01); *B65B 57/00* (2013.01);
(Continued)

(58) Field of Classification Search
CPC .................................................. B65B 2210/06
See application file for complete search history.

(56) References Cited

U.S. PATENT DOCUMENTS

2009/0241469 A1* 10/2009 Moessnang ........... B65B 31/024
53/209
2009/0260320 A1* 10/2009 Miller ................... B65B 31/024
53/94
(Continued)

*Primary Examiner* — Benjamin P Sandvik
(74) *Attorney, Agent, or Firm* — Jon M. Isaacson

(57) ABSTRACT

A packaging apparatus and a method of operating the apparatus are provided. The apparatus comprises a support frame, a packaging station having a first tool, a second tool, and one or more actuators, operably coupled to at least one of the first tool and the second tool, to modify a position of the second tool with respect to the first tool; and a control unit operably coupled to the one or more actuators, wherein the one or more actuators have a first configuration, in which the first tool and the second tool are spaced from one another by a first distance, a second configuration, in which the first tool and the second tool are spaced from one another by a second distance, and a third configuration, in which the first tool and the second tool are spaced from one another by a third distance, and wherein the control unit is configured to operate in a first modality, wherein the control unit is configured to move the one or more actuators from the first configuration into the second configuration, to maintain the one or more actuators in the second configuration for a first time interval, and to move the one or more actuators from the second configuration into the first configuration.

13 Claims, 6 Drawing Sheets

(51) Int. Cl.
*B65B 31/02* (2006.01)
*B65B 57/00* (2006.01)
*F15B 11/12* (2006.01)
*B65B 35/10* (2006.01)
*G05B 19/402* (2006.01)

(52) U.S. Cl.
CPC ............ *B65B 59/00* (2013.01); *F15B 11/123* (2013.01); *G05B 19/402* (2013.01); *G05B 2219/37618* (2013.01); *G05B 2219/45048* (2013.01)

(56) References Cited

U.S. PATENT DOCUMENTS

2009/0272080 A1* 11/2009 Lachenmeier .......... B65B 59/04 53/461
2011/0247303 A1* 10/2011 Haring .................. B65B 31/024 53/396
2013/0067859 A1* 3/2013 Kult ........................ B65B 59/04 53/287
2013/0247521 A1* 9/2013 May .......................... B65B 5/06 53/473

* cited by examiner

FIG.2a
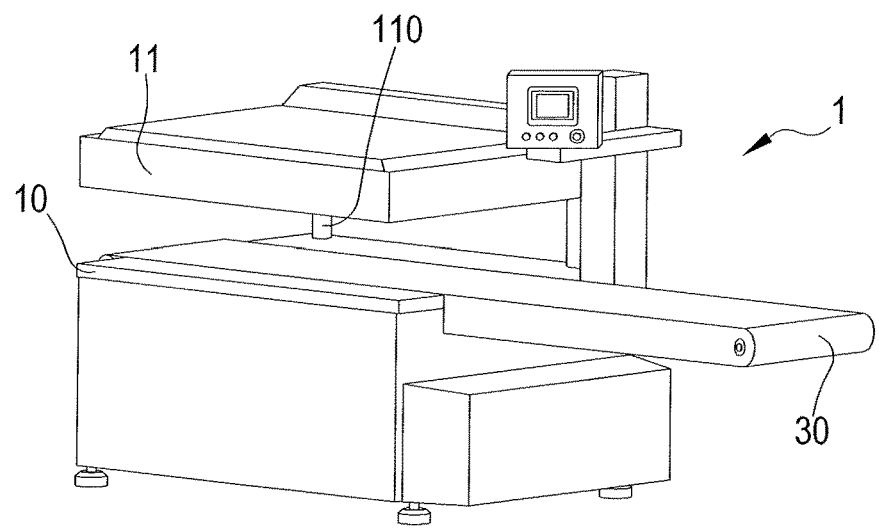
FIG.2b
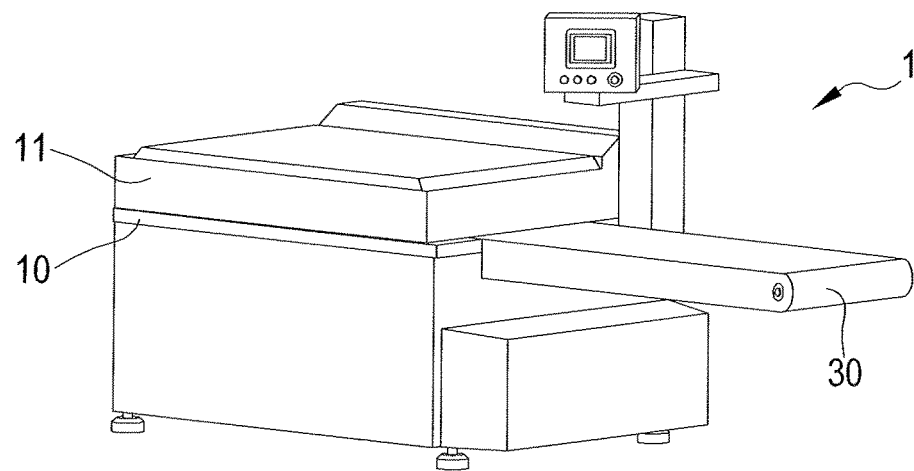
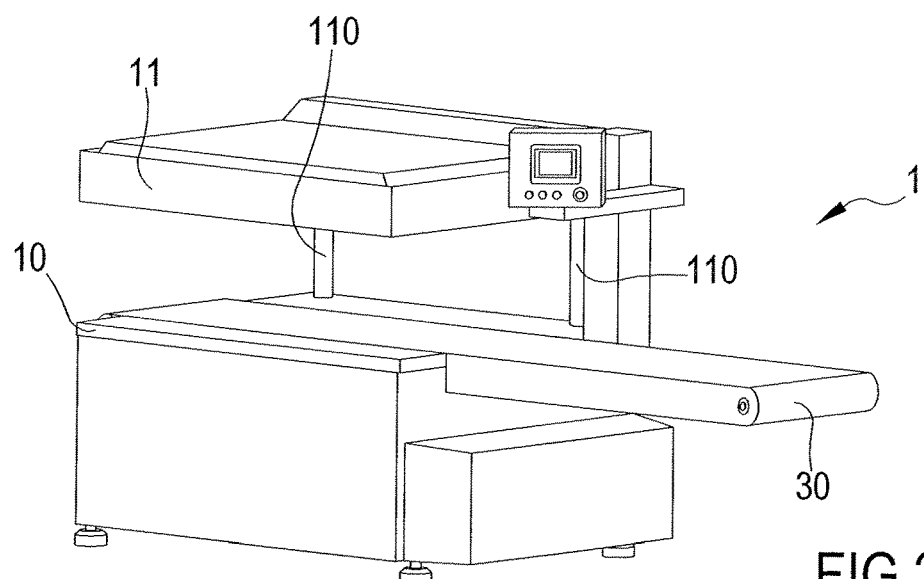
FIG.2c

FIG.3a
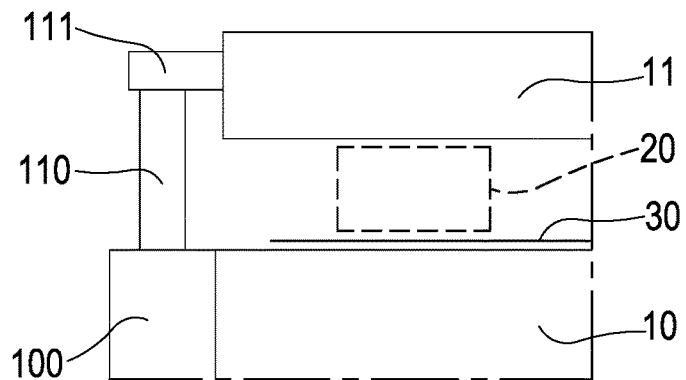
FIG.3b
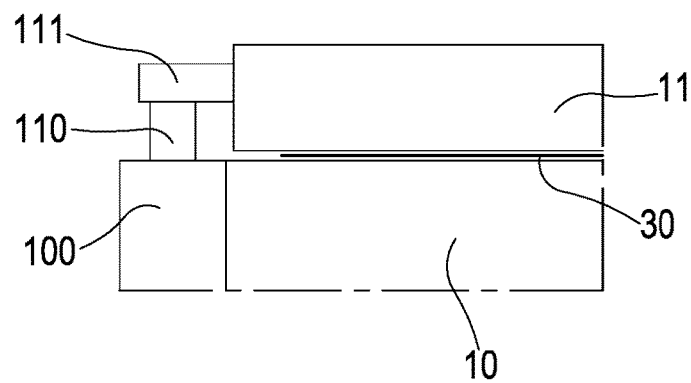
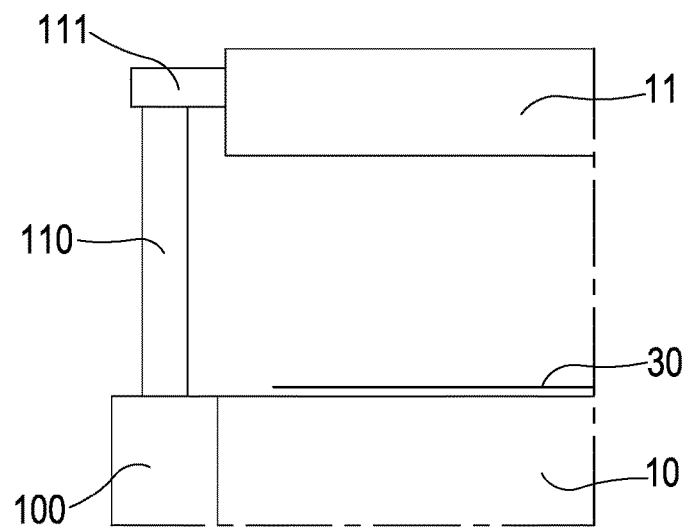
FIG.3c

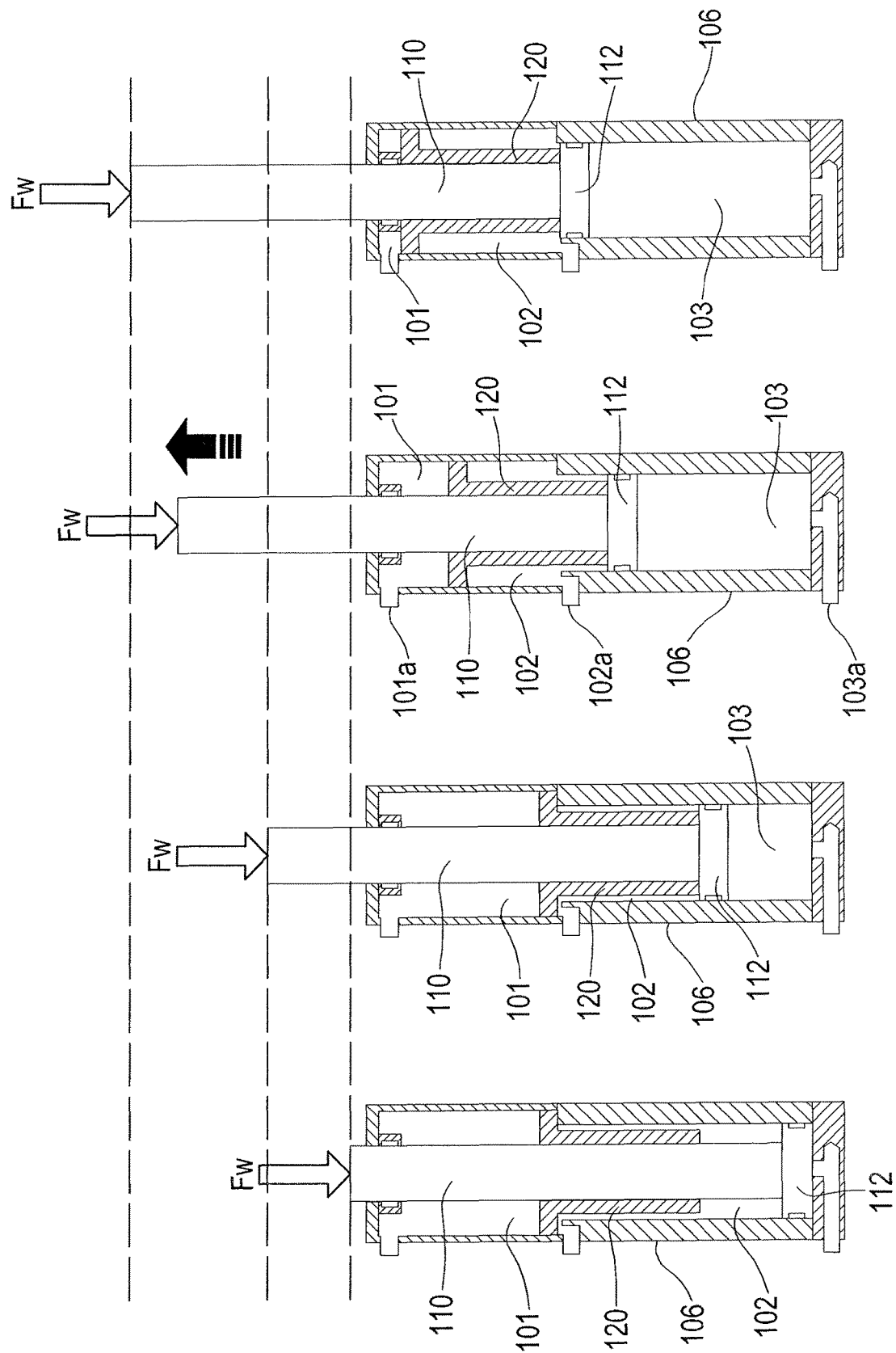

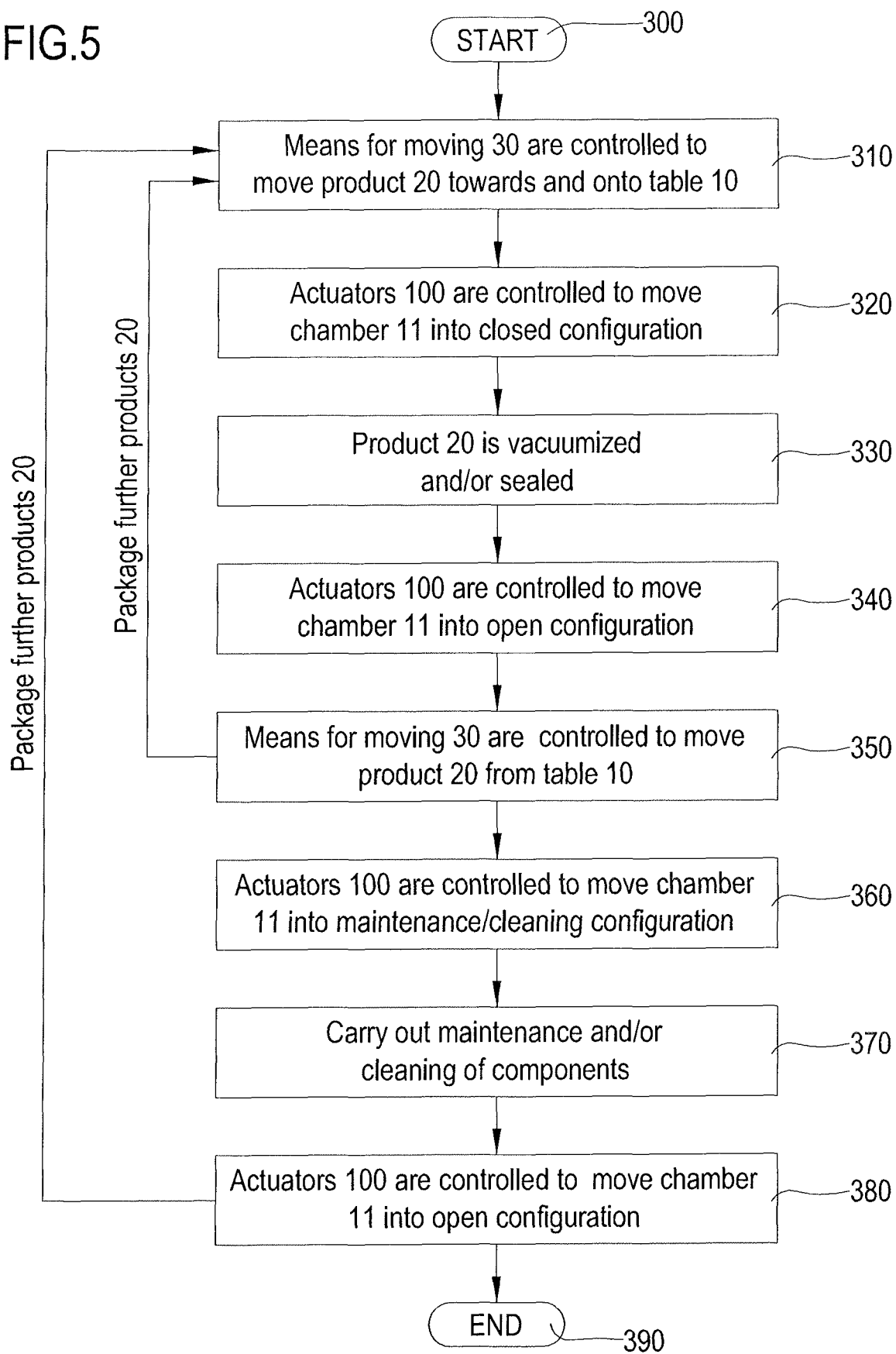

PACKAGING APPARATUS COMPRISING ACTUATOR AND METHOD OF OPERATING PACKAGING APPARATUS

TECHNICAL FIELD

The present invention relates to a packaging apparatus having one or more two-stroke pneumatic actuators. In accordance with other aspects the invention relates to a method for controlling an actuator for a packaging apparatus during a packaging process.

BACKGROUND ART

Vacuum packaging of products generally requires a semi-packaged product to be subjected to a controlled environment (e.g., inert gas, pressure, temperature, etc.) within a chamber of some kind, in order to vacuumize and seal the product. During the packaging process, the products first have to be processed and pre-packaged, for example, by inserting the product into an open bag made from a suitable material. Subsequently, the products are moved towards a vacuumization and sealing station, where vacuumization and sealing takes place. In order to provide the controlled environment, semi-packaged products usually have to be moved into a chamber, which is then closed in order to establish the controlled environment. After vacuumization and sealing, the products have to be removed from the chamber, which has to be opened for this step. Packaging apparatuses can comprise a number of components that enable to moving of products and of components of the packaging apparatus with respect to each other. For example, a packaging apparatus can comprise electric or hydraulic actuators that open and close the chamber and/or drive a conveyor belt.

EP0381020 discloses a vacuum-packaging machine for packaging waste having a container space for receiving an open bag, as well as a hinged lid, which hermetically seals the container space to the outside, and a discharging device. So that the lid is not soiled on its inner side, the bag is provided with a collar and a groove connected thereto. The latter is suspended in fixing bolts in the lid.

CA1235648 discloses a method and apparatus for vacuum shrink packaging a product that includes the steps of placing the product in a heat shrinkable thermoplastic bag; then shrinking the bag in a heated gaseous medium, while partially constricting the mouth of the bag to cause ballooning of the bag, further provided that the constricting is selected such that shrinkage of the bag overcomes the ballooning to collapse the bag onto the product; and then placing the bag in a vacuum chamber followed by vacuumizing and in-chamber sealing, further provided that the rate of vacuumizing is limited to substantially prevent reballooning of the bag.

CA1235942 discloses a method and apparatus for vacuum packaging a molded meat product in a cook-in bag that includes the steps of vacuum stuffing a substantially deaerated moldable meat product into a thermoplastic bag lining a cooking mold, the bag having a length greater than the mold to define a bag neck; substantially removing any meat from the bag neck; and then, while still under vacuum, gathering and clipping the bag neck.

U.S. Pat. No. 6,343,537 discloses a dual stroke cylinder having a piston for sliding in a cylinder, a rod of the piston, and a sleeve fitted over the rod and passing through a rod hole of the cylinder. A lock portion is provided to an outer periphery of a tip end portion of the rod. The sleeve having an outer peripheral face for sliding in the rod hole in the cylinder and an inner peripheral face for sliding on an outer peripheral face of the rod is provided with an engaging portion on an inner end side to be engaged with an inside of the rod hole of the cylinder and an engaging portion at an outer end side to be engaged with the lock portion of the rod.

EP2174538 discloses a working device for an agricultural vehicle a working unit having a work organ, where an adjustment device is subjected with a pressure for adjusting the working unit between a working position and a transport position. The adjustment device has a piston of an adjuster that is adjustable along a piston rod.

EP0914896, DE3809461, DE102009037959, and U.S. Pat. No. 3,469,503 disclose devices having double cylinders in which a piston head is movably arranged within a cylinder, wherein the cylinder is movably arranged with another cylinder.

It is an object of the invention to provide a packaging apparatus provided with a two-stroke actuator that facilitates efficient and reliable movement of a vacuum chamber relative to a table during operation of a packaging apparatus.

It is a further object of the invention to provide a method of operating a packaging apparatus provided with two-stroke actuators in accordance with the present invention.

SUMMARY OF INVENTION

One or more of the objects specified above are substantially achieved by a process and by an apparatus according to any one of the appended claims.

According to the invention, in a $1^{st}$ aspect there is provided a packaging apparatus comprising a support frame; a packaging station having a first tool, a second tool, and one or more actuators, operably coupled to at least one of the first tool and the second tool, to modify a position of the second tool with respect to the first tool; and a control unit operably coupled to the one or more actuators, wherein the one or more actuators have a first configuration, in which the first tool and the second tool are spaced from one another by a first distance, a second configuration, in which the first tool and the second tool are spaced from one another by a second distance, and a third configuration, in which the first tool and the second tool are spaced from one another by a third distance, and wherein the control unit is configured to operate in a first modality, wherein the control unit is configured to move the one or more actuators from the first configuration into the second configuration, to maintain the one or more actuators in the second configuration for a first time interval, and to move the one or more actuators from the second configuration into the first configuration. Note that in the apparatus and method in accordance with any one of the aspects of the invention described in the present document, as well as in the apparatus and method in accordance with any one of the appended claims, the control unit is preferably an electronic device. For example the control unit comprises one or more CPUs (digital microprocessors) or an analog type circuitry or a combination of one or more digital microprocessors with analog circuitry.

In a $2^{nd}$ aspect, according to the $1^{st}$ aspect, the actuators each comprise a fixed portion and a movable portion, wherein the fixed portion of each of the one or more actuators is fixedly coupled to at least one of the first tool and the second tool, or wherein the movable portion of each of the one or more actuators is fixedly coupled to at least one of the first tool and the second tool. Note that in the apparatus and method in accordance with any one of the aspects of the invention described in the present document, as well as in the apparatus and method in accordance with any one of the appended claims, each of the one or more actuators is preferably a linear actuator such that—when moving from one of said first, second and third configurations to another of said first, second and third configurations—the first and second tools are relatively displaced by a relative translational movement.

In a $3^{rd}$ aspect, according to any one of the preceding aspects, the apparatus further comprises a means for moving configured for providing one or more products to the packaging station, and wherein the first distance is substantially zero, the second distance being greater than the first distance and allowing movement of the one or more products into a region between the first tool and the second tool, and the third distance being greater than the second distance.

In a $4^{th}$ aspect, according to any one of the preceding aspects, the first tool is fixedly coupled to the support frame of the packaging apparatus and the second tool is movably coupled to the support frame of the packaging apparatus at least by means of said one or more actuators.

In a $5^{th}$ aspect, according to any one of the preceding aspects, the first tool and the second tool are configured to form, in the first configuration, a substantially closed chamber.

In a $6^{th}$ aspect, according to any one of aspects 3 to 5, the first tool comprises a table fixedly coupled to the support frame, and the second tool comprises a chamber movably coupled to the support frame, the chamber having an open side that is, in the first configuration, substantially closed by contacting the table and/or the means for moving, optionally the means for moving being configured to move the one or more products onto the table, at least a part of the means for moving being interposed between the table and the chamber.

In a $7^{th}$ aspect, according to any one of the preceding aspects, the apparatus further comprises a fluid distribution system supplying a fluid, optionally wherein the fluid is a gaseous fluid, further optionally wherein the gaseous fluid is air, and wherein the fluid distribution system is operably coupled to the one or more actuators to provide a supply of the fluid to the one or more actuators.

In an $8^{th}$ aspect, according to any one of the preceding aspects, the control unit is further configured to operate in a second modality, wherein the control unit is configured to move the one or more actuators from the first configuration into the third configuration, to maintain the one or more actuators in the third configuration for a second time interval, and to move the one or more actuators from the third configuration into the first configuration, wherein the third configuration is distinct from the second configuration.

In a $9^{th}$ aspect, according to any one of aspects 7 and 8, the control unit is operably coupled to the fluid distribution system and configured to control the supply of the fluid to the one or more actuators, optionally wherein the control unit is coupled to a plurality of valves of the fluid distribution system and configured to control the plurality of valves to control the supply of the fluid to the one or more actuators.

In a $10^{th}$ aspect, according to any one of the preceding aspects, each of the one or more actuators has a first chamber and a first access port, a second chamber and a second access port, and a third chamber and a third access port, the first, second, and third chambers each being in fluid communication respectively with the first, second, and third access ports.

In an $11^{th}$ aspect, according to the preceding aspect, the fluid distribution system is connected to said first, second and third access ports of each of the one or more actuators and wherein the control unit is configured to control the fluid distribution system such that the one or more actuators are moved into or maintained in the first configuration by applying a force to the movable portion of each of the one or more actuators in a direction of movement of the movable portion, and applying a fluid having a first pressure to the first access port, a fluid having a second pressure to the second access port, and a fluid having a third pressure to the third access port, wherein, in each of the one or more actuators a force exerted by the first pressure is higher than a force exerted by the second pressure, and a force exerted by the third pressure is lower than the sum of a force exerted by the second pressure and the force applied to the movable portion.

In a $12^{th}$ aspect, according to any one of aspects 10 and 11, the fluid distribution system is connected to said first, second and third access ports of each of the one or more actuators and wherein the control unit is configured to control the fluid distribution system such that the one or more actuators are moved into or maintained in the second configuration by applying a force to the movable portion of each of the one or more actuators in a direction of movement of the movable portion, and applying a fluid having a first pressure to the first access port, a fluid having a second pressure to the second access port, and a fluid having a third pressure to the third access port, wherein, in each of the one or more actuators a force exerted by the third pressure is greater than the sum of a force exerted by the second pressure and the force applied to the movable portion, and the sum of a force exerted by the first pressure and the force applied to the movable portion is greater than the sum of a force exerted by the second pressure and a force exerted by the third pressure.

In a $13^{th}$ aspect, according to any one of aspects 10 to 12, the fluid distribution system is connected to said first, second and third access ports of each of the one or more actuators and wherein the control unit is configured to control the fluid distribution system such that the one or more actuators are moved into or maintained in the third configuration by applying a force to the movable portion of each of the one or more actuators in a direction of movement of the movable portion, and applying a fluid having a first pressure to the first access port, a fluid having a second pressure to the second access port, and a fluid having a third pressure to the third access ports, wherein, in each of the one or more actuators a force exerted by the third pressure is greater than the sum of a force exerted by the first pressure, a force exerted by the second pressure, and the force applied to the movable portion, and a force exerted by the first pressure is equal to or greater than the force exerted by the second pressure.

In a $14^{th}$ aspect, according to any one of the preceding aspects, in each of the one or more actuators the fixed portion comprises a hollow body, the hollow body having a first end and a second end, the hollow body defining a longitudinal axis; and the movable portion comprises an inner piston.

In a $15^{th}$ aspect, according to the preceding aspect, each of the one or more actuators further comprises an outer piston arranged within the hollow body and coaxially with the longitudinal axis, the outer piston being movable along the longitudinal axis between a first position and a second position, the outer piston having a first end and a second end.

In a $16^{th}$ aspect, according to the preceding aspect, in each of the one or more actuators the inner piston has a piston head, the inner piston being partly arranged within and extending through the outer piston, the inner piston further extending from the second end of hollow body through an opening in the second end, the inner piston further being arranged coaxially with the longitudinal axis and being movable along the longitudinal axis between a first position and a second position, the piston head being arranged within the hollow body on an opposite side of the outer piston with respect to the second side of the hollow body.

In a 17$^{th}$ aspect, according to any one of the preceding aspects, wherein in each of the one or more actuators the hollow body has a first section and a second section, wherein the first section has a first inner diameter and the second section has a second inner diameter, the first inner diameter being smaller than the second inner diameter, the first and second sections defining an inner protrusion in a region of contact therebetween due to the first and second inner diameters being different from one another.

In an 18$^{th}$ aspect, according to the preceding aspect, in each of the one or more actuators the outer piston further comprises an outer protrusion configured to define the first position of the outer piston by abutting the inner protrusion of the hollow body.

In a 19$^{th}$ aspect, according to the preceding aspect, in each of the one or more actuators the inner piston is movable between a first position, a second position, and a third position, the first position being defined by the piston head abutting the first end of the hollow body, the second position being defined by the piston head abutting the first end of the outer piston while the outer piston is in its first position, and the third position being defined by the piston head abutting the first end of the outer piston while the outer piston is in its second position, and wherein the first configuration is defined by the inner piston being in the first position, the second configuration is defined by the inner piston being in the second position, and the third configuration is defined by the inner piston being in the third position.

In a 20$^{th}$ aspect, according to the preceding aspect, in each of the one or more actuators the first chamber is enclosed by an inner surface of the hollow body and the second surface of the outer piston, the second chamber is enclosed by the inner surface of the hollow body, the first surface of the outer piston, and the second surface of the piston head, and the third chamber is enclosed by the first end of the hollow body and the first surface of the piston head, the hollow body further comprising a first access port, a second access port, and a third access port and the first, second, and third chambers each being in fluid communication respectively with the first, second, and third access ports; and wherein the inner piston can be moved between its first, second, and third positions by applying a fluid to the first, second, and/or third access ports.

In a 21$^{st}$ aspect, according to the preceding aspect, in each of the one or more actuators the outer piston extends at least in part through both the first and second sections of the hollow body.

In a 22$^{nd}$ aspect, according to the preceding aspect, in each of the one or more actuators the outer protrusion of the outer piston is further configured to define the second position of the outer piston by abutting the second end of the hollow body; or wherein the hollow body further comprises a bearing arranged at the second end of the hollow body and the outer protrusion of the outer piston is further configured to define the second position of the outer piston by abutting the bearing.

In a 23$^{rd}$ aspect, according to any one of aspects 11 to 22, the force is applied to the inner piston along the longitudinal axis and in direction from the second end of the hollow body to the first end of the hollow body.

In a 24$^{th}$ aspect, according to any one of aspects 14 to 22, in each of the one or more actuators the hollow body is a substantially cylindrical body and the longitudinal axis is defined by the central axis of the cylindrical body.

In a 25$^{th}$ aspect, according to any one of aspects 14 to 24, the control unit is coupled to and configured to control the one or more actuators to alternately move their respective inner piston into the first, second, and third positions, wherein the chamber assumes a first configuration when the respective inner piston of the one or more actuators is in the first position, the chamber assumes a second configuration when the respective inner piston of the one or more actuators is in the second position, and the chamber assumes a third configuration when the respective inner piston of the one or more actuators is in the third position.

In a 26$^{th}$ aspect, according to any one of the preceding aspects, the apparatus further comprises a means for moving, optionally wherein the control unit is configured to control the means for moving, optionally wherein the means for moving comprise a conveyor belt.

In a 27$^{th}$ aspect, there is provided a method for operating an apparatus according to one of the preceding aspects, the method comprising the steps of controlling the one or more actuators into the second configuration; moving the one or more products into the region between the first tool and the second tool; controlling the one or more actuators into the first configuration; performing packaging of the one or more products; controlling the one or more actuators into the second configuration; and removing the one or more products from the region between the first tool and the second tool; the method further comprising the steps of controlling the one or more actuators into the third configuration; performing maintenance on one or more components of the packaging apparatus; and controlling the one or more actuators into the second configuration.

In a 28$^{th}$ aspect, according to the preceding aspect, the one or more components comprise one or more of the first tool; the second tool; and the one or more actuators.

Further according to the invention, in a 29$^{th}$ aspect there is provided an actuator, comprising a hollow body; a first piston having a piston rod and a piston head, the first piston being movably coupled to the hollow body, the piston head being arranged within the hollow body and being configured to slidably displace within the hollow body by a prefixed main stroke; a second piston, movably coupled to the piston rod, adjacent to the piston head and within the hollow body, the second piston being configured to slidably displace along the piston rod by a prefixed auxiliary stroke which is a portion of the main stroke; wherein, during its main stroke, the piston head is configured to displace from a first end-run position, where the piston head abuts against a first end of the hollow body and is at least axially spaced from the second piston, to an intermediate position, where the piston head acts on the second piston, and from the intermediate position to a second end-run position, where the second piston abuts against a second end of the hollow body.

In a 30$^{th}$ aspect, according to the 29$^{th}$ aspect, the piston head of the first piston, at said intermediate position, is configured to abut against the second piston whereby the first and second pistons are at least axially coupled during displacement of the first piston from the intermediate position to the second end run position.

In a 31$^{st}$ aspect, according to any one of aspects 29 to 30, the second piston is axially slidable along the piston rod and has an outer projection; and wherein the second piston is configured to take at least a first position and a second position, the first position being at a first end of said auxiliary stroke and being defined by the outer projection abutting against an inner abutment portion of the hollow body and the second position being at a second end of said auxiliary stroke and being defined by the second piston abutting against the second end of the hollow body.

In a 32$^{nd}$ aspect, according to the 31$^{st}$ aspect, the actuator further comprises a first chamber delimited at least by the second piston, the piston rod of the first piston and the hollow body; a second chamber delimited at least by the first piston, the hollow body and the second piston; and a third chamber at least delimited by the first piston and the body.

In a 33$^{rd}$ aspect, according to any one of aspects 29 to 32, the actuator further comprises a first access port; a second access port; and a third access port; wherein the first, second, and third chambers are in fluid communication respectively with the first, second, and third access ports.

In a 34$^{th}$ aspect, according to the 33$^{rd}$ aspect, the actuator is configured such that the first piston is moved into or maintained in the first end-run position by applying a force to the piston rod of the first piston in a direction from the second end-run position to the first end-run position; a fluid having a first pressure to the first access port, a fluid having a second pressure to the second access port, and a fluid having a third pressure to the third access ports, and wherein a force exerted upon the second piston by the first pressure is higher than a force exerted upon the second piston by the second pressure, and a force exerted upon the piston head by the third pressure is lower than the sum of a force exerted upon the piston head by the second pressure and the force applied to the piston rod.

In a 35$^{th}$ aspect, according to the 33$^{rd}$ aspect, the actuator is configured such that the first piston is moved into or maintained in the intermediate position by applying a force to the piston rod of the first piston in a direction from the second end-run position to the first end-run position; a fluid having a first pressure to the first access port, a fluid having a second pressure to the second access port, and a fluid having a third pressure to the third access ports, and wherein a force exerted upon the piston head by the third pressure is greater than the sum of a force exerted upon the piston head by the second pressure and the force applied to the piston rod, and the sum of a force exerted upon the second piston by the first pressure and the force applied to the piston rod is greater than the sum of a force exerted upon the second piston by the second pressure and a force exerted upon the piston head by the third pressure.

In a 36$^{th}$ aspect, according to the 33$^{rd}$ aspect, the actuator is configured such that the first piston is moved into or maintained in the second end-run position by applying a force to the piston rod of the first piston in a direction from the second end-run position to the first end-run position; a fluid having a first pressure to the first access port, a fluid having a second pressure to the second access port, and a fluid having a third pressure to the third access ports, wherein a force exerted upon the piston head by the third pressure is greater than the sum of a force exerted upon the second piston by the first pressure, a force exerted upon the piston head by the second pressure, and the force applied to the piston head, and a force exerted upon the second piston by the first pressure is equal to or greater than the force exerted upon the second piston by the second pressure.

In a 37$^{th}$ aspect, according to any one of aspects 29 to 36, the hollow body defines a longitudinal axis; the second piston is arranged within the hollow body and coaxially with the longitudinal axis, the second piston having a first end and a second end.

In a 38$^{th}$ aspect, according to the 37$^{th}$ aspect, the piston rod extends through the second piston, the piston rod further extending from the second end of the hollow body through an opening in the second end, the piston rod further being arranged coaxially with the longitudinal axis and being movable along the longitudinal axis.

In a 39$^{th}$ aspect, according to the 38$^{th}$ aspect, the piston head is arranged within the hollow body on an opposite side of the second piston with respect to the second side of the hollow body.

In a 40$^{th}$ aspect, according to any one of aspects 29 to 39, the hollow body has a first section and a second section, wherein the first section has a first inner diameter and the second section has a second inner diameter, the first inner diameter being smaller than the second inner diameter, the first and second sections defining the inner abutment portion in a region of contact therebetween due to the first and second inner diameters being different from one another.

In a 41$^{st}$ aspect, according to any one of aspects 29 to 40, the first end-run position of the first piston is defined by the piston head abutting against the first end of the hollow body; the intermediate position of the first piston is defined by the piston head abutting a first end of the second piston while the outer projection of the second piston abuts against the inner abutment portion of the hollow body; and wherein the second end-run position of the first piston is defined by the piston head abutting the first end of the second piston while the second end of the second piston abuts the second end of the hollow body.

In a 42$^{nd}$ aspect, according to any one of aspects 29 to 41, the fluid is compressed gas, optionally wherein the fluid is compressed air.

In a 43$^{rd}$ aspect, according to any one of aspects 29 to 42, the second piston extends at least in part through both the first and second sections of the body.

In a 44$^{th}$ aspect, according to any one of aspects 29 to 43, the outer protrusion of the second piston is further configured to define the second end-run position of the first piston by abutting against the second end of the hollow body; or wherein the hollow body further comprises a bearing arranged at the second end of the hollow body and the outer protrusion of the second piston is further configured to define the second end-run position of the first piston by abutting against the bearing.

In a 45$^{th}$ aspect, according to any one of aspects 29 to 44, the hollow body is a substantially cylindrical body and the longitudinal axis is defined by the central axis of the cylindrical body.

In an 46$^{th}$ aspect, there is provided a use of an actuator according to any one of the preceding aspects in a packaging apparatus comprising a first tool and a second tool, at least one of the first and second tools being coupled to the actuator; for bringing the first tool and the second tool into a first configuration, in which the first tool and the second tool are spaced apart from one another by a first distance, a second configuration, in which the first tool and the second tool are spaced apart from one another by a second distance greater than the first distance, or a third configuration, in which the first tool and the second tool are spaced apart from one another by a third distance greater than the second distance, by controlling a displacement of the piston head of the actuator into the first end-run position, the intermediate position, or the second end-run position.

In a 47$^{th}$ aspect, according to the 46$^{th}$ aspect, the displacement of the piston head of the actuator into the first end-run position is controlled by applying a force to the first piston along the longitudinal axis and in direction from the second end of the body to the first end of the body, and moving the first piston into or maintaining the first piston in the first end-run position by applying a fluid having a first pressure to the first access port, a fluid having a second pressure to the second access port, and a fluid having a third pressure to the third access ports, wherein a force exerted upon the second piston by the first pressure is higher than a force exerted upon the second piston by the second pressure, and a force exerted upon the piston head by the third pressure is lower than the sum of a force exerted upon the piston head by the second pressure and the force applied to the piston rod.

In a 48$^{th}$ aspect, according to any one of the 46$^{th}$ or 47$^{th}$ aspects, the displacement of the piston head of the actuator into the intermediate position is controlled by applying a force to the first piston along the longitudinal axis and in direction from the second end of the body to the first end of the body, and moving the first piston into or maintaining the first piston in the intermediate position by applying a fluid having a first pressure to the first access port, a fluid having a second pressure to the second access port, and a fluid having a third pressure to the third access ports, wherein a force exerted upon the piston head by the third pressure is greater than the sum of a force exerted upon the piston head by the second pressure and the force applied to the piston rod, and the sum of a force exerted upon the second piston by the first pressure and the force applied to the piston rod is greater than the sum of a force exerted upon the second piston by the second pressure and a force exerted upon the piston head by the third pressure.

In a 49$^{th}$ aspect, according to any one of aspects 46 to 48, the displacement of the piston head of the actuator into the second end-run position is controlled by applying a force to the first piston along the longitudinal axis and in direction from the second end of the body to the first end of the body, and moving the first piston into or maintaining the first piston in the second end-run position by applying a fluid having a first pressure to the first access port, a fluid having a second pressure to the second access port, and a fluid having a third pressure to the third access ports, wherein a force exerted upon the piston head by the third pressure is greater than the sum of a force exerted upon the second piston by the first pressure, a force exerted upon the piston head by the second pressure, and the force applied to the piston head, and a force exerted upon the second piston by the first pressure is equal to or greater than the force exerted upon the second piston by the second pressure.

In a 50$^{th}$ aspect, there is provided a kit, comprising one or more actuators according to one of aspects 29 to 45; a fluid distribution system providing a supply of fluid; and a control unit; wherein the control unit is configured to control a displacement of the piston head of each of the one or more actuators into the first end-run position, the intermediate position, or the second end-run position, by controlling the supply of fluid to each of the one or more the actuators.

In a 51$^{st}$ aspect, there is provided a packaging apparatus comprising a means for moving, a packaging station having a first tool and a second tool, and one or more actuators according to one of aspects 29 to 45, wherein the one or more actuators are operably coupled to at least one of the first tool and the second tool, to modify a spatial relationship of the second tool with respect to the first tool, and wherein the means for moving are configured to move one or more products to and from an area between the first tool and the second tool.

Advantages include that the first and second tools of the packaging apparatus can be controlled to assume different configurations, whereas the configurations are precisely defined and the tools assume the individual configuration in an effective and reliable manner.

Further advantages include that the first and second tools can be positioned in a quick, precise and efficient manner due to a specific damping behaviour of the actuators whereas structural stresses exerted upon the first and second tools are substantially reduced.

Further advantages include that the actuators are configured to withstand not only longitudinal forces but also lateral forces applied to the actuator body, the pistons, and/or piston rod in order to reliably and efficiently position the first and second tools.

Additional advantages can be derived from the description and the attached claims.

BRIEF DESCRIPTION OF DRAWINGS

The present invention will become clearer by reading the following detailed description, given by way of example and not of limitation, to be read with reference to the accompanying drawings, wherein:

FIG. 2a shows an isometric view of an embodiment of a packaging apparatus according to the present invention, wherein the chamber is in an open configuration;

FIG. 2b shows an isometric view of the embodiment shown in FIG. 2a, wherein the chamber is in a closed configuration;

FIG. 2c shows an isometric view of the embodiment shown in FIG. 2a, wherein the chamber is in a maintenance configuration;

FIG. 3a shows a side view of the embodiment and configuration shown in FIG. 2a;

FIG. 3b shows a side view of the embodiment and configuration shown in FIG. 2b;

FIG. 3c shows a side view of the embodiment and configuration shown in FIG. 2c;

FIG. 4a shows a first configuration of the embodiment of FIG. 4.

FIG. 4b shows the embodiment of FIG. 4, wherein the actuator is in a second configuration;

FIG. 4c shows the embodiment of FIG. 4, wherein the actuator is in a state of transition between the second configuration and a third configuration;

FIG. 4d shows the embodiment of FIG. 4, wherein the actuator is in the third configuration;

FIG. 5 shows a flow chart of controlling the movements of a product and a chamber with respect to a table of a packaging apparatus.

DETAILED DESCRIPTION

Figure 1:
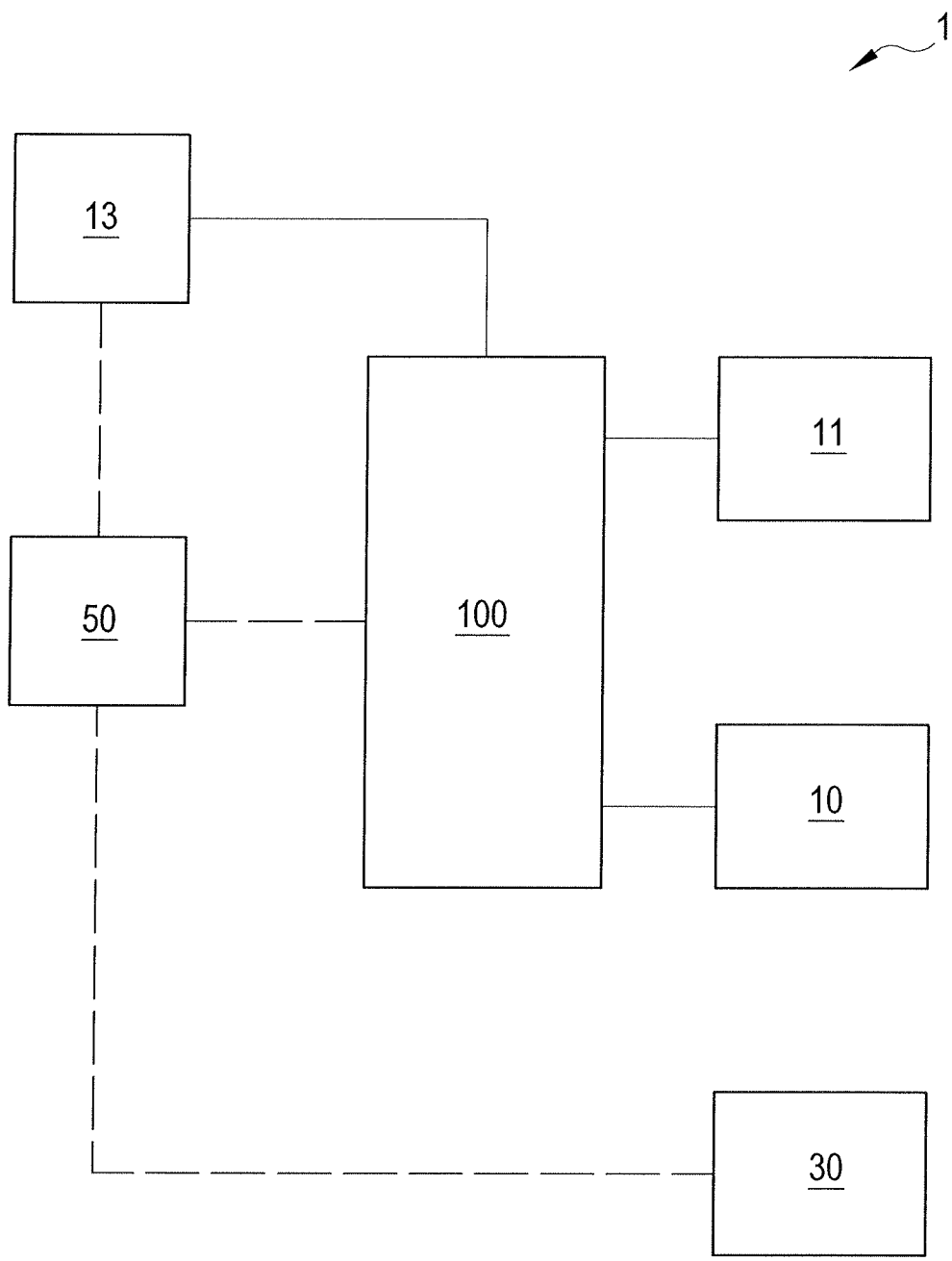
FIG. 1 shows a schematic overview of components of a packaging apparatus according to the present invention.

FIG. 1 shows a schematic overview of components of a packaging apparatus according to the present invention. In general, packaging apparatus 1 comprises a first tool 10 and a second tool 11, operatively coupled by one or more actuators 100. Further, packaging apparatus 1 can comprise means for moving 30, a fluid distribution system 13, and a control unit 50. The control unit is connected to the one or more actuators 100, the means for moving 30, and/or the fluid distribution system. The control unit is configured to control the one or more actuators 100 in order to modify a spatial relationship between the first and second tools 10 and 11. The control unit 50 can be configured to control the fluid distribution system 13 in order to provide fluid in a controlled manner to the one or more actuators 100 to effect the modification of the spatial relationship between the first and second tools 10 and 11. The means for moving are configured to move a product 20 (not shown) with respect to the packaging apparatus and/or with respect to the first and/or second tools 10 and 11. The control unit 50 can be configured to control the means for moving 30. In some embodiments, the means for moving can comprise one or more conveyor belts. In some embodiments, the first tool 10 comprises a table and/or the second tool 11 comprises a chamber.

In general, a product 20 is pre-loaded into an open bag and means for moving 30 move the preloaded product 20 towards and onto the first tool 10. The control unit 50 controls the one or more actuators 100 in order to modify the spatial relationship between the first and second tools 10 and 11 such that the product 20 is enclosed by the first and second tools 10 and 11. In this configuration, vacuumization and/or sealing take place. Subsequently, the control unit 50 controls the one or more actuators 100 in order to modify the spatial relationship between the first and second tools 10 and 11 such that the product 20 is no longer enclosed by the first and second tools 10 and 11 and can be moved by means for moving 30 away from between the first and second tools 10 and 11 for further processing or packaging.

FIGS. 2a, 2b, and 2c show an isometric view of a first embodiment of a packaging apparatus according to the present invention illustrating different operating configurations. In general, packaging apparatus 1 comprises a table 10, a chamber 11, one or more actuators 100 (not shown in their entirety), and means for moving 30, whereas chamber 11 is movably coupled to packaging apparatus 1 by inner pistons 110 (see, e.g., FIGS. 2a and 2c) of actuators 100.

The packaging apparatus can optionally comprise a loading station (not shown) where products 20 can be pre-processed. For example, products 20 can be loaded one by one into bags and moved towards and onto table 10 in a semi-packaged state, where each bag is still open on one end. In this example, the semi-packaged product or products 20 are moved towards and onto table 10, whereas generally one or more products 20 can be processed in the same processing step. Subsequently, the product or products 20 are vacuumized and sealed within chamber 11, and excess packaging material is cut and disposed of. As shown in FIGS. 2a to 2c, chamber 11 can assume different configurations that are employed during processing (e.g. packaging, vacuumization, and/or sealing) and during maintenance/cleaning.

Without limitation, the processing is further described with respect to a single product 20. However, it is understood that a plurality of products can be processed in parallel in the same or a similar manner.

Generally, product 20 is moved by means for moving 30 onto table 10 of packaging apparatus 1, while chamber 11 is in an open configuration shown in FIG. 2a. In a next step, chamber 11 is lowered onto table 10 by means of actuators 100 (not shown) in order to assume a closed configuration as shown in FIG. 2b. Then, product 20 is vacuumized and/or sealed. Subsequently, chamber 11 is moved by actuators 100 into the open configuration again and by means for moving 30 move product 20 from table 10, while a next product 20 is moved onto table 10, upon which the process is repeated as needed.

For purposes of maintenance/cleaning, chamber 11 can assume a maintenance configuration as shown in FIG. 2c. It is noted that the maintenance configuration facilitates service and/or maintenance work that can be carried out on one or more components of the packaging apparatus 1, in particular chamber 10 and table 10, as well as (sub-) components thereof, by providing better access than the other configurations to a number of individual (sub-) components. In the same manner, the maintenance configuration further facilitates cleaning and/or treatment work that can be carried out on one or more components of the packaging apparatus. Cleaning and/or treatment can, for example, be carried out on chamber 11, table 10, means for moving 30, as well as sealing bars, cutters, and other components located in or around chamber 11 or any of the aforementioned components. For clarity, the configuration facilitating service, maintenance, cleaning, treatment, etc. is generally referred to as "maintenance configuration" without implying any specific limitations whatsoever.

FIG. 2a shows an isometric view of the first embodiment of the packaging apparatus 1. Chamber 11 as shown in FIG. 2a is in an open configuration. The open configuration of chamber 11 allows for a product 20 to be moved onto table 10 and to be positioned with respect to table 10 and chamber 11, for example by means for moving 30, in order to facilitate packaging (e.g., vacuumization, sealing, etc.) by means of apparatus 1. In the embodiment shown in FIGS. 2a to 2c, chamber 11 can be moved from the closed configuration into the open configuration in about 2 seconds or less. The time required to move chamber 11 from the open configuration into the closed configuration is substantially the same (e.g. 2 seconds or less). In this embodiment, the production stroke of the actuator 100, i.e. the distance between chamber 11 and table 10 in the open configuration, is about 200 mm. In general, the production stroke of the actuator 100, i.e. the distance between table 10 and chamber 11 in the open configuration can range from 150 mm to 350 mm. More generally, the production stroke of the actuator 100 can range from 100 mm to 500 mm.

The control unit 50 is further configured to maintain chamber 11 in the open configuration for a time interval that allows the means for moving 30 to move one or more products 20 towards and onto table 10, preferably into a predefined area below chamber 11.

FIG. 2b shows an isometric view of the first embodiment of the packaging apparatus 1. Chamber 11 as shown in FIG. 2b is in a closed configuration. The closed configuration of chamber 11 allows for substantially sealed contact between chamber 11 and table 10 and/or means for moving 30, respectively, creating a sealed volume inside chamber 11. The sealed volume in side chamber 11 allows for vacuumization and sealing of the semi-packaged product 20. The vacuumization and sealing is performed in a manner known in the art.

The control unit 50 is further configured to maintain chamber 11 in the closed configuration for a time interval that allows for vacuumization and sealing of the one or more products 20.

FIG. 2c shows an isometric view of the first embodiment of the packaging apparatus 1. Chamber 11 as shown in FIG. 2c is in a maintenance configuration (i.e. the configuration facilitating service, maintenance, cleaning, treatment, etc.; see above). In the maintenance configuration, the distance between chamber 11 and table 10 is greater than the distance between chamber 11 and table 10 in the open configuration shown in FIG. 2a. In the maintenance configuration the distance between table 10 and chamber 11 is large enough in order for service personnel to examine table 10, chamber 11, actuators 100, pistons 110 and other components of packaging apparatus 1 and to service and/or work on any components in need of service, maintenance, cleaning, treatment, etc. In the embodiment shown in FIGS. 2a to 2c, chamber 11 can be moved from the open configuration into the maintenance configuration in about 5 seconds or less. In this embodiment, the maintenance stroke of the actuator 100, i.e. the distance between chamber 11 and table 10 in the maintenance configuration is about 400 mm. In general, the maintenance stroke of the actuator 100, i.e. the distance between table 10 and chamber 11 in the maintenance configuration can range from 300 mm to 450 mm. More generally, the maintenance stroke of the actuator 100 can range from 200 mm to 600 mm.

With respect to the open, closed, and maintenance configurations of chamber 11 as described above, it is noted that control unit 50 is configured to operate at least in a first modality, which facilitates normal operation of the packaging apparatus 1. In the normal operation condition, control unit 50 is configured to alternate chamber 11 between the open an closed configurations, as well as to control at least means for moving 30 to move the one or more products 20 towards the packaging machine 1, onto table 10, and, after vacuumization and sealing, from table 10 onwards.

The control unit 50 is further configured to shift from the first modality to a second modality, which facilitates maintenance or cleaning or the packaging apparatus 1 as described above. The shift from the first modality to the second modality can be triggered manually (e.g. by a user) or automatically (e.g., by control unit 50) due to external or internal events. An external event can include, for example, operating personnel actively or manually causing a shift by performing an input via a user interface connected to the control unit. Such an active or manual shift can be necessitated by scheduled maintenance or cleaning being due or by other environmental or operational reasons. An internal event can include a detection of a condition of the packaging apparatus or of one of its components, for example, a fault condition, a sensor signal, a timer signal, or a signal based on one of the operating parameters of the packaging apparatus.

The means for moving 30 are configured to create relative motion between product 20 and packaging apparatus 1. For example, the means for moving 30 can be configured to move product 20 from a loading station towards and onto table 10, and further through packaging apparatus 1. The means for moving can comprise one or more conveyor belts. For example, the means for moving 30 can comprise an entry or infeed belt, a buffer belt, and/or an exit belt, and other kinds of belts or conveyors.

In one embodiment, chamber 11 can have an open side designed to contact table 10, table 10 thereby closing chamber 11. Chamber 11 can have a weight of about 300 kg and dimensions of 1000 mm-2800 m×120 mm-350 mm×300 mm-1500 mm (length×height×width).

Fluid distribution system 13 can comprise a source for fluid. In one embodiment, the fluid is a gaseous fluid, for example air. The fluid distribution system 13 can supply the fluid at a pressure of between 400 kPa and 800 kPa.

The packaging apparatus 1 further comprises a control unit 50. The control unit is connected to one or more components of the packaging apparatus 1, for example the actuators 100, chamber 11, and means for moving 30. The control unit can be connected to further components of the packaging apparatus 1, including a loading station, a sealing station, sealing and/or cutting members, a gas blower.

For reasons of clarity, the figures do not show individual connection lines between the control unit 50 and all components. It is understood that the packaging apparatus 1 can comprise common connection means for connecting control unit 50 to other components, for example electrical, optical, or other connections and/or leads.

The control unit 50 can be is configured for commanding the transport of products 20 along a predefined path, e.g. by controlling a motor comprised in means for moving 30 according to a step-by-step motion or according to a continuous motion. Control unit 50 is further controlling actuators 100, thereby controlling movement of chamber 11 with respect to table 10. The control unit can also command further actuators or components, for example, in order to create seals or cuts.

The control unit can comprise a digital processor (CPU) with memory (or memories), an analogical type circuit, or a combination of one or more digital processing units with one or more analogical processing circuits. In the present description and in the claims it is indicated that the control unit is "configured" or "programmed" to execute certain steps. This may be achieved in practice by any means, which allow for configuring or programming the control unit. For instance, in case of a control unit comprising one or more CPUs, one or more programs are stored in an appropriate memory. The program or programs contain instructions, which, when executed by the control unit, cause the control unit to execute the steps described and/or claimed in connection with the control unit. Alternatively, if the control unit is of an analogical type, then the circuitry of the control unit is designed to include circuitry configured, in use, to process electric signals such as to execute the control unit steps herein disclosed.

Control unit 50 can further be configured to control one or more components depending on signals sent to and/or received from other components. For example, the control unit 50 can be configured to control an activation of one or more components depending on the position of products 20 with respect to other components of packaging apparatus 1. This way, the control unit 50 can activate, for example, the actuators 100 when a product 20 is positioned on table 10, such that chamber 11 can be moved to the closed position in order to effect packaging and/or sealing of the product or products 20.

FIG. 3a shows a side view of the embodiment and configuration shown in FIG. 2a. A first (e.g. lower) side of chamber 11, a top surface of table 10 and means for moving 30 are arranged in a substantially parallel orientation to one another. In some embodiments, table 10 can comprise a top portion of a support frame. Chamber 11 is coupled to inner pistons 110 of one or more actuators 100 either directly or through connecting means 111. The arrangement of the one or more actuators 100 is described in the following by describing the arrangement of a single actuator 100. It is understood that the one or more actuators 100 are arranged in an identical or substantially similar manner.

The lower side of chamber 11 faces table 10 and means for moving 30. Chamber 11 is coupled to inner piston 110 of actuator 100 so that the lower side of chamber 11 is arranged perpendicularly to the actuating direction of inner piston 110 and parallel to the surface of table 10 and means for moving 30. The body 106 of actuator 100 is directly or indirectly coupled to table 10 (and or the supporting frame thereof) of packaging apparatus 1. In this manner, actuator 100 can vertically move chamber 11 while maintaining the relative orientation of table 10 and the lower side of chamber 11 parallel to one another, varying the distance there between.

The one or more actuators 100 can be controlled, e.g. by control unit 50, in order to move chamber 11 into the open configuration shown in FIGS. 2a and 3a, into the closed configuration shown in FIGS. 2b and 3b, or into the maintenance configuration shown in FIGS. 2c and 3c. The one or more actuators 100 can comprise double-stroke pneumatic cylinders as described in detail below, carrying chamber 11.

FIG. 3b shows a side view of the embodiment and configuration shown in FIG. 2b. Chamber 11 is in the closed configuration, the lower side of chamber 11 being parallel to and in substantially sealed contact with table 10 and means for moving 30. Due to the substantially sealed contact between chamber 11 and table 10 and/or means for moving 30, the means for moving 30 have to be in a static state, not creating relative motion between the semi-packaged products and the table 10 and/or chamber 11. In other words, the means for moving 30 transport the product or products 20 into a position between chamber 11 and table 10, in which vacuumization and/or sealing can be performed. During vacuumization and/or sealing of product or products 20, means for moving 30 are not in operation (i.e. are standing still). It is noted that means for moving generally operate intermittently, thereby providing relative motion between product or products 20 and the packaging apparatus 1 in certain process steps, but remaining still in other processing steps (e.g., vacuumization, sealing, pre-processing, cleaning, maintenance, treatment, etc.).

FIG. 3c shows a side view of the embodiment and configuration shown in FIG. 2c. Chamber 11 is in the maintenance configuration, maintaining a specific distance to table 10 and means for moving 30 allowing for service, maintenance, cleaning, treatment, etc. of the components of packaging apparatus 1 as described above.

Figure 4:
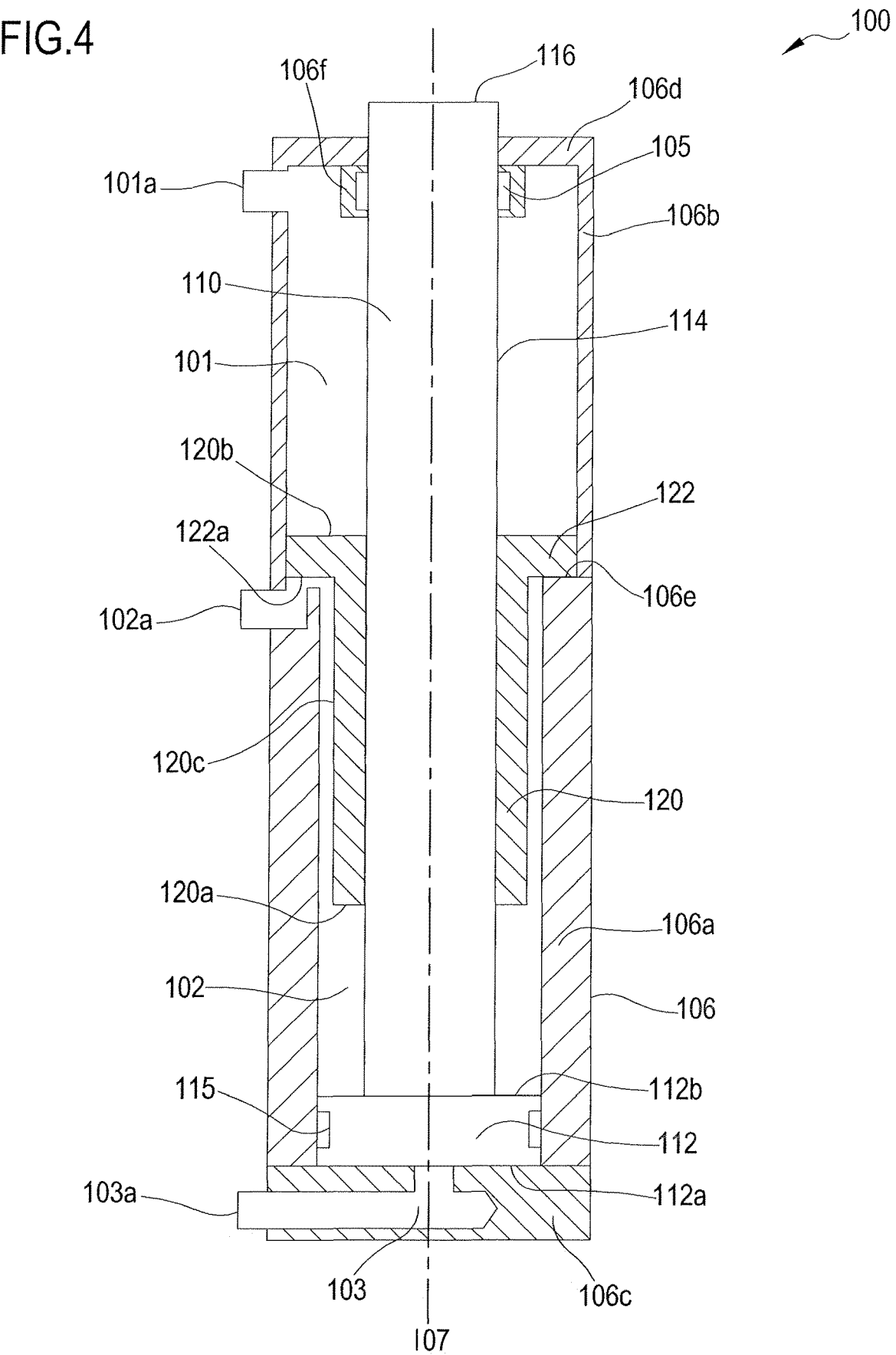
FIG. 4 shows an embodiment of an actuator according to the present invention.

FIG. 4 shows an embodiment of an actuator 100 according to the present invention. In general, actuator 100 comprises a body 106, a first piston (or inner piston) 110, and a second piston (or outer piston) 120. In the following, the first piston is generally referred to as inner piston 110 and the second piston is generally referred to as outer piston 120, without limitation. Body 106 is a hollow body that can have, in general, a cylindrical shape. Further, body 106 and inner and outer pistons 110 and 120 define chambers 101, 102, and 103 (see also FIGS. 4a, 4b, 4c, and 4d for the different states of chambers 101, 102, and 103).

Body 106 comprises a first section 106a and a second section 106b. The first section 106a is coaxially arranged in series with the second section 106b, defining a common longitudinal axis 107 of body 106. Body 106 further comprises a first end 106c and a second end 106d, in contact with first section 106a and second section 106b, respectively. Body 106 further comprises a first conduit 101a, in fluid communication with chamber 101, a second conduit 102a, in fluid communication with chamber 102, and a third conduit 103a, in fluid communication with chamber 103.

In some embodiments, first and second sections 106a and 106b are integrally formed, defining a body 106 in one piece. Further, first section 106a and first end 106c, and/or second section 106b and second end 106d, can be integrally formed (i.e. be in one piece). Thus, in some embodiments, a combination of first and second sections 106a and 106b and first and second ends 106c and 106d can be integrally formed to define body 106 essentially in one piece. Body 106 can further comprise a bearing 106f arranged proximally to second end 106d. The bearing 106f can comprise a sealing gasket and/or dirt wiper. In the embodiment shown in FIG. 4, bearing 106f is coupled to an inner surface of second end 106d of body 106, the opening and bearing 106f being arranged coaxially to longitudinal axis 107. Bearing 106f can comprise a sliding bush 105.

In the embodiment shown in FIG. 4, second section 106b and second end 106d are integrally formed and arranged together with separate first section 106a and separate first end 106c to define body 106 in a three-piece assembly.

The first section 106a defines an inner diameter different from an inner diameter defined by the second section 106b. In the embodiment shown in FIG. 4, the inner diameter of the first section 106a is smaller than the inner diameter of the second section 106b, defining an inner projection 106e of body 106, formed between first section 106a and second section 106b.

Inner piston 110 and outer piston 120 are arranged coaxially with longitudinal axis 107 of body 106. Inner piston 110 is guided by an inner surface of outer piston 120. Inner piston 110 is further guided by bearing 106f and/or by an opening in second end 106d of body 106. Inner piston 110 comprises at one end thereof and fixedly attached thereto a piston head 112 facing towards the first end 106c of body 106. The outer diameter of piston head 112 essentially corresponds to the inner diameter of the first section 106a of body 106, thus facilitating sealed sliding contact between the two components. Piston head 112 further has a first surface 112a and an opposite second surface 112b, the first surface 112a being arranged facing the first end 106c of body 106. Inner piston 110 is further guided due to piston head 112 being guided by the inner surface of the first section 106a of body 106.

Outer piston 120 comprises a cylindrical projection 122, arranged distally to the first end 106c of body 106 and coaxially to longitudinal axis 107. Outer piston 120 is guided in in sealed sliding contact by the inner surface of second section 106b of body 106 by contact between the projection 122 and the inner surface of second section 106b of body 106. Outer piston 120 is further guided by sealed sliding contact between the inner surface of outer piston 120 and inner piston 110. The sealed sliding contact between the inner surface of outer piston 120 and inner piston 110 can be facilitated by a guiding bushing. Projection 122 further has a first surface 122a and an opposite second surface 120b, the first surface 112a being arranged facing the first end 106c of body 106. Outer piston 120 further has a first surface 120a facing second surface 112b of piston head 112 (and also the first end 106c of body 106).

Outer piston 120 is slidably arranged within body 106 where it can assume a lowermost position and an uppermost position with respect to a use connotation of actuator 100 in which the first end 106c of body 106 is arranged below the second end 106d of body 106. During operation, inner 110 and outer 120 pistons general assume their respective end-run positions only. However, if controlled in a suitable manner, inner 110 and outer piston 120 can be controlled to assume one or more intermediate positions between the lowermost and uppermost positions.

Inner piston 110 is slidably arranged partly within body 106 and outer piston 120, where it can assume a lowermost position (e.g., a first end-run position) and an uppermost position (e.g., a second end-run position) with respect to a use connotation of actuator 100 in which the first end 106c of body 106 is arranged below the second end 106d of body 106. Piston head 112 is slidably arranged within body 106 and inner piston 110 is slidably arranged partly within body 106, partly extending upward and outward through the opening in second end 106d of body 106. Inner piston 110 is further slidably arranged partly within outer piston 120, whereas outer and inner pistons 120 and 110 can be moved along axis 107 with respect to each other and with respect to body 106. The lowermost position of inner piston 110 is defined by contact between piston head 112 and first end 106c of body 106. The uppermost position of inner piston 110 is defined by the position of outer piston 120 between its lowermost and uppermost positions, by contact between first surface 120a of outer piston 120 and second surface 112b of piston head 112.

In some embodiments, actuator 100 is configured to withstand certain stresses by the selection of suitable materials and by providing components of actuator 100 with suitable dimensions (e.g. a diameter of piston rod 116, and or a material chosen for piston head 112). In one embodiment, piston rod 116 and/or connecting means 111 are designed to withstand a torque applied in the region of coupling between chamber 11, piston rod 116 (and, optionally, connecting means 111) of up to 3000 Nm. In another embodiment, piston rod 116 is further or alternatively configured to withstand a longitudinal force applied longitudinally along the length thereof of up to 6500 N. In another embodiment, piston rod 116 and piston head 112 are further or alternatively configured to withstand a transversal force applied transversally (e.g. perpendicularly) to the length thereof of up to 5500 N. In a preferred embodiment, piston rod 116 is made of a material comprising steel or stainless steel and has a diameter of about 70 mm. Piston head 112 is made from a material comprising aluminium alloy and has a diameter of about 100 mm. Outer piston 120 is made from a material comprising aluminium alloy and has an outer diameter of about 125 mm and an inner diameter of about 100 mm.

FIGS. 4a, 4b, 4c, and 4d show different configurations of actuator 100. In the embodiment shown, a force $F_w$ is applied to piston rod 116 in a direction parallel to its longitudinal axis and directed from the top to the bottom of actuator 100 (i.e. from the second end 106d of body 106 towards its first end 106c, parallel to longitudinal axis 107). The force $F_w$ can result from the weight of a component carried by actuator 100, for example chamber 11. In one example, the weight of chamber 11 is about 300 kg. Preferably, the weight of the chamber can be between 200 kg and 400 kg.

In general, the actuator or actuators 100 are controlled to vary the distance between chamber 11 and table 10 in different stages of operation of packaging apparatus 1 as described below with respect to FIG. 5. In the open configuration, chamber 11 is spaced apart from table 10 in order to facilitate moving of a product 20 to be vacuumized and/or sealed onto table 10 and below chamber 11. In some embodiments, chamber 11 can be distanced from table 10 by 200 mm. The distance can range from about 150 mm to about 350 mm.

When chamber 11 is spaced apart from table 10, actuator(s) 100 are in the second configuration, in which inner piston 112 is in an intermediate position, between a lower end-run position, in which piston rod 116 is retracted into body 106 and an upper end-run position, in which piston rod 116 is extended from body 106.

In order to lower chamber 11 onto table 10, actuator(s) 100 are controlled to move inner piston 110 into the lower end-run position, the actuator(s) 100 assuming the first configuration.

In the first configuration of actuator(s) 100, chamber 11 contacts table 10, substantially sealing the inner of chamber 11 from the environment. Contact can totally or partially be made between chamber 11 and table 10 and/or means for moving 30, depending on an area of overlap between the area covered by chamber 11 and the area of table 10 that is covered by means for moving 30. For example, if the means for moving is a conveyor belt, sealed contact between chamber 11 and table 10 can be made entirely through the conveyor belt. Alternatively, chamber 11 can extend beyond the conveyor belt and establish sealed contact in part directly with table 10, and in part through the conveyor belt.

While chamber 11 is substantially closed by being in contact with table 10 and/or means for moving 30. During vacuumization and/or sealing, chamber 11 can maintain a substantially sealed contact with table 10 and/or means for moving 30.

When chamber 11 is substantially in contact with table 10 and/or means for moving 30, actuator(s) 100 are in the first configuration, in which inner piston 110 is in the lower end-run position and piston rod 116 is retracted into body 106.

Actuator 100 can execute a first stroke of inner piston 110, with the inner piston 110 alternating between the lower end-run position and the intermediate position. This first stroke is performed during vacuumization/sealing, wherein in the open configuration of chamber 11, packaged products are moved from table 10 by means for moving 30 and semi-packaged products to be vacuumized/sealed are moved onto table 10 by means for moving 30. In the closed configuration of chamber 11, vacuumization and/or sealing takes place. In this manner, chamber 11 alternates between the open and closed configurations by actuator(s) 100 alternating between the second and first configurations.

In one embodiment, actuator(s) 100 can be controlled to move from the second configuration into the first configuration, or vice versa, in 2 seconds or less.

FIG. 4a shows the first configuration of the embodiment of FIG. 4. In the first configuration, inner piston 110 is in a lowermost position in which the piston head 112 abuts against the lower end 106c of body 106. In this configuration, piston rod 116 is retracted into body 106, defining the lower end-run position for piston head 116.

In general, actuator(s) 100 can be controlled by applying a fluid, for example compressed air, to the first 101a, second 102a, and third 103a access ports, the pressure of which acts upon the inner and outer pistons. The fluid can be supplied by a fluid distribution system 13 (not shown in FIGS. 4a to 4d). In one embodiment, the fluid distribution system is configured to supply a fluid at an operating pressure of between about 400 kPa and about 800 kPa.

Actuator(s) 100 can be controlled to assume the first configuration by applying a fluid to the first 101a, second 102a, and third 103a access ports in the presence of force $F_w$ applied to piston rod 116 and, thereby, to piston head 112. In one example, this can be achieved by applying a fluid having a first pressure to the first 101a access port, a fluid having a second pressure to the second 102a access port, and a fluid having a third pressure to the third 103a access ports, such that the first pressure is higher than or equal to the second pressure, and a force exerted onto piston head 112 by the third pressure is lower than the sum of a force exerted upon the piston head 112 resulting from the second pressure and the force $F_w$ applied to the inner piston 110. In one example, the force is about 3000 N, the third pressure is about atmospheric pressure, the second pressure is about 400 to 800 kPa, and the first pressure is about 400 to 800 kPa.

FIG. 4b shows the embodiment of FIG. 4, wherein the actuator is in the second configuration. Actuator(s) 100 can be controlled to assume the second configuration by applying a fluid to the first 101a, second 102a, and third 103a access ports in the presence of force $F_w$ applied to piston rod 116. In one example, this can be achieved by applying a first pressure to the first 101a access port, a fluid having a second pressure to the second 102a access port, and a fluid having a third pressure to the third 103a access ports, such that the sum of a force exerted upon the outer piston 120 resulting from the first pressure and the force $F_w$ applied to the inner piston 110 is greater than a force exerted by the second pressure, a force exerted by the third pressure is greater than the sum of a force exerted upon the piston head 112 resulting from the second pressure and the force $F_w$ applied to the inner piston 110, and the sum of a force exerted upon the outer piston 120 resulting from the first pressure and the force $F_w$ applied to the inner piston 110 is greater than the sum of a force exerted upon the outer piston 120 resulting from the second pressure and a force exerted upon the piston head 112 resulting from the third pressure.

Beyond the first and second configurations, actuator(s) 100 can further be controlled to assume a third configuration, in which chamber 11 is spaced apart from table 10 in a distance greater than that in the second configuration. This third configuration can be used in an operating state of packaging apparatus 1, in which the apparatus is undergoing service, maintenance, cleaning, or treatment. By providing an additional clearance between the chamber 11 and the table 10, access to components of packaging apparatus 1 is facilitated, for example access to table 10, means for moving 30, chamber 11, or other components. In this third configuration, the maintenance stroke of the actuator 100, i.e. the distance between chamber 11 and table 10 in the maintenance configuration is about 400 mm. In general, the maintenance stroke of the actuator 100, i.e. the distance between table 10 and chamber 11 in the maintenance configuration can range from 300 mm to 450 mm. More generally, the maintenance stroke of the actuator 100 can range from 200 mm to 600 mm.

FIG. 4c shows the embodiment of FIG. 4, wherein the actuator is in a state of transition between the second configuration and a third configuration. FIG. 4c illustrates that the pressures applied to the first, second, and third access ports can be controlled as to move inner piston 110 in contact with outer piston 120 from the intermediate position into the upper end-run position.

FIG. 4d shows the embodiment of FIG. 4, wherein the actuator is in the third configuration. Actuator(s) 100 can be controlled to assume the second configuration by applying a fluid to the first 101a, second 102a, and third 103a access ports in the presence of force $F_w$ applied to piston rod 116. In one example, this can be achieved by applying a first pressure to the first 101a access port, a fluid having a second pressure to the second 102a access port, and a fluid having a third pressure to the third 103a access ports, such that a force exerted by the third pressure is greater than the sum of a force exerted upon the outer piston 120 resulting from the first pressure, a force exerted upon the outer piston 120 and the piston head 112 resulting from the second pressure, and the force $F_w$ applied to the inner piston 110, and a force exerted upon the piston head 112 resulting from the first pressure is equal to or greater than the force exerted upon the outer piston 120 and the piston head 112 resulting from the second pressure.

FIG. 5 shows a flow chart of controlling the movements of product or products 20 and chamber 11 with respect to table 10. The process is described, without prejudice, with respect to a single product 20, although a plurality of products 20 can also be processed in essentially the same manner. Product 20 can comprise product 20 disposed in a suitable container, for example in an open bag made of a film. Product 20 is then placed on or moved onto means for moving 30. In step 310, means for moving 30 are controlled to move product 20 towards and onto table 10, positioned below chamber 11, while chamber 11 is in the open configuration. In step 320, one or more actuators 100 are controlled to move chamber 11 into the closed configuration, chamber 11 entirely covering product 20 and assuming a substantially sealed relationship with table 10 and/or means for moving 30. In the closed configuration, means for moving 30 are temporarily stopped in order to facilitate substantially sealed contact between chamber 11, table 10, and/or means for moving 30. In step 330, product 20 is vacuumized and/or sealed. For example, one or more semi-packaged products are positioned and oriented in a manner that allows for an open side of each bag to be in fluid communication with the inside of chamber 11, thereby facilitating vacuumization of the bag. Further, the open side of each bag is sealed by sealing means (e.g., a seal bar and a counter seal bar acting to grip and seal the bag at the open end thereof). Optionally, excess material is cut from the bag on a side opposite the now packaged product 20 with respect to the newly created seal. In step 340, the one or more actuators 100 are controlled to move chamber 11 into the open configuration, chamber 11 being lifted from table 10, means for moving 30, and product 20, to allow for movement of product 20 from table 10 by means for moving 30. In step 350, means for moving 30 are controlled to move the vacuumized and sealed product 20 from table 10. In the same step, a subsequent product 20—if present—is moved towards and onto table 10, in which case the process continues at step 320 (step 350 substantially including step 310). Means for moving 30 can be configured to carry out steps 310 and 350 substantially at the same time, moving a product 20 from table 10 and at the same time moving a subsequent product 20 towards and onto table 10, for example both products being carried on a single conveyor belt or on cooperating conveyor belts.

If packaging apparatus 1 is to undergo service, maintenance, cleaning, treatment, etc. (e.g., if there is no subsequent product 20 to be packaged), the corresponding maintenance operation begins at step 360. In step 360, the one or more actuators 100 are controlled to move chamber 11 into the maintenance configuration, providing additional clearance between chamber 11 and table 10 and/or means for moving 30, thereby facilitating substantially unrestricted access to the components of packaging apparatus 1. In step 370, individual components of packaging apparatus 1 (e.g. chamber 11, table 10, means for moving 30, actuators 100, inner pistons 110, connecting means 111, seal bars, counter seal bars, cutters, knifes, and/or other components) are serviced, maintained, cleaned, or treated, or other similar work is carried out as necessary. For example, the apparatus 1 and its components can be cleaned In step 380, the one or more actuators 100 are controlled to move chamber 11 into the open configuration again, and packaging and/or sealing of products 20 can resume, in which case the process continues at step 310.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

The invention claimed is:

1. A packaging apparatus comprising:
    a support frame;
    a packaging station having a first tool, a second tool, and one or more actuators, operably coupled to at least one of the first tool and the second tool, to modify a position of the second tool with respect to the first tool; and a control unit comprising at least one of a digital processor (CPU) with memory and an analogical type circuit, the control unit being operably coupled to the one or more actuators, wherein the one or more actuators operate in one of:
   a first configuration, in which the first tool and the second tool are spaced from one another by a first distance,
   a second configuration, in which the first tool and the second tool are spaced from one another by a second distance, and
   a third configuration, in which the first tool and the second tool are spaced from one another by a third distance,
wherein the control unit is configured to operate in a first modality wherein the control unit is configured to:
   move the one or more actuators from the first configuration into the second configuration,
   maintain the one or more actuators in the second configuration for a first time interval, and
   move the one or more actuators from the second configuration into the first configuration,
wherein the first tool and the second tool are configured to form, in the first configuration, a substantially closed chamber, and wherein the control unit is further configured to operate in a second modality wherein the control unit is configured to:
   move the one or more actuators from the first configuration into the third configuration,
   maintain the one or more actuators in the third configuration for a second time interval, and
   move the one or more actuators from the third configuration into the first configuration,
further wherein the third configuration is distinct from the second configuration,
wherein in the first configuration the first tool and the second tool are spaced apart from one another by said first distance, in the second configuration the first tool and the second tool are spaced apart from one another by a second distance greater than the first distance, and in the third configuration the first tool and the second tool are spaced apart from one another by a third distance greater than the second distance,
wherein the apparatus further comprises a fluid distribution system operably coupled to the one or more actuators to provide a supply of the fluid to the one or more actuators and the control unit is operably coupled to the fluid distribution system and configured to control the supply of the fluid to the one or more actuators and maintain the one or more actuators in any one of said first configuration, second configuration and third configuration,
wherein each of the one or more actuators has a first fluid chamber and a first access port, a second fluid chamber and a second access port, and a third fluid chamber and a third access port, the first, second, and third fluid chambers each being in fluid communication respectively with the first, second, and third access ports.

2. The apparatus of claim 1, wherein the fluid distribution system is connected to said first, second and third access ports of each of the one or more actuators and wherein the control unit is configured to control the fluid distribution system such that the one or more actuators are moved into or maintained in the first configuration by:
   applying a force to the movable portion of each of the one or more actuators in a direction of movement of the movable portion, and
   applying a fluid having a first pressure to the first access port, a fluid having a second pressure to the second access port, and a fluid having a third pressure to the third access port, wherein, in each of the one or more actuators:
      a force exerted by the first pressure is higher than a force exerted by the second pressure, and
      a force exerted by the third pressure is lower than a sum of a force exerted by the second pressure and the force applied to the movable portion.

3. The apparatus of claim 1 wherein the fluid distribution system is connected to said first, second and third access ports of each of the one or more actuators and wherein the control unit is configured to control the fluid distribution system such that the one or more actuators are moved into or maintained in the second configuration by:
   applying a force to the movable portion of each of the one or more actuators in a direction of movement of the movable portion, and
   applying a fluid having a first pressure to the first access port, a fluid having a second pressure to the second access port, and a fluid having a third pressure to the third access port, wherein, in each of the one or more actuators:
      a force exerted by the third pressure is greater than a sum of a force exerted by the second pressure and the force applied to the movable portion, and
      a sum of a force exerted by the first pressure and the force applied to the movable portion is greater than a sum of a force exerted by the second pressure and a force exerted by the third pressure.

4. The apparatus of claim 1 wherein the fluid distribution system is connected to said first, second and third access ports of each of the one or more actuators and wherein the control unit is configured to control the fluid distribution system such that the one or more actuators are moved into or maintained in the third configuration by:
   applying a force to the movable portion of each of the one or more actuators in a direction of movement of the movable portion, and
   applying a fluid having a first pressure to the first access port, a fluid having a second pressure to the second access port, and a fluid having a third pressure to the third access ports, wherein, in each of the one or more actuators:
      a force exerted by the third pressure is greater than a sum of a force exerted by the first pressure, a force exerted by the second pressure, and the force applied to the movable portion, and
      a force exerted by the first pressure is equal to or greater than the force exerted by the second pressure.

5. A packaging apparatus comprising:
   a support frame;
   a packaging station having a first tool, a second tool, and one or more actuators, operably coupled to at least one of the first tool and the second tool, to modify a position of the second tool with respect to the first tool; and
   a control unit comprising at least one of a digital processor (CPU) with memory and an analogical type circuit, the control unit being operably coupled to the one or more actuators, wherein the one or more actuators operate in one of:
      a first configuration, in which the first tool and the second tool are spaced from one another by a first distance, a second configuration, in which the first tool and the second tool are spaced from one another by a second distance, and a third configuration, in which the first tool and the second tool are spaced from one another by a third distance, wherein the control unit is configured to operate in a first modality wherein the control unit is configured to:

move the one or more actuators from the first configuration into the second configuration, maintain the one or more actuators in the second configuration for a first time interval, and move the one or more actuators from the second configuration into the first configuration, wherein the first tool and the second tool are configured to form, in the first configuration, a substantially closed chamber, and wherein the control unit is further configured to operate in a second modality wherein the control unit is configured to:

move the one or more actuators from the first configuration into the third configuration, maintain the one or more actuators in the third configuration for a second time interval, and move the one or more actuators from the third configuration into the first configuration, further wherein the third configuration is distinct from the second configuration, wherein in the first configuration the first tool and the second tool are spaced apart from one another by said first distance, in the second configuration the first tool and the second tool are spaced apart from one another by a second distance greater than the first distance, and in the third configuration the first tool and the second tool are spaced apart from one another by a third distance greater than the second distance, wherein the first tool is fixedly coupled to the support frame of the packaging apparatus and wherein the second tool is movably coupled to the support frame of the packaging apparatus at least by means of said one or more actuators, wherein the actuators each comprise a fixed portion and a movable portion, wherein the fixed portion or the movable portion of each of the one or more actuators is fixedly coupled to at least one of the first tool and the second tool, wherein in the one or more actuators:

the fixed portion comprises a hollow body, the hollow body having a first end and a second end, the hollow body defining a longitudinal axis; and the movable portion comprises an inner piston, and wherein the one or more actuators further comprises:

an outer piston arranged within the hollow body and coaxially with the longitudinal axis, the outer piston being movable along the longitudinal axis between a first position and a second position, the outer piston having a first end and a second end;

further wherein in each of the one or more actuators:

the inner piston has a piston head, the inner piston being partly arranged within and extending through the outer piston, the inner piston further extending from the second end of hollow body through an opening in the second end, the inner piston further being arranged coaxially with the longitudinal axis and being movable along the longitudinal axis between a first position and a second position, the piston head being arranged within the hollow body on an opposite side of the outer piston with respect to the second side of the hollow body.

6. The apparatus of claim 5, wherein the hollow body has a first section and a second section, wherein the first section has a first inner diameter and the second section has a second inner diameter, the first inner diameter being smaller than the second inner diameter, the first and second sections defining an inner protrusion in a region of contact therebetween due to the first and second inner diameters being different from one another;

the outer piston further comprises an outer protrusion configured to define the first position of the outer piston by abutting the inner protrusion of the hollow body;

the inner piston is movable between a first position, a second position, and a third position, the first position being defined by the piston head abutting the first end of the hollow body, the second position being defined by the piston head abutting the first end of the outer piston while the outer piston is in its first position, and the third position being defined by the piston head abutting the first end of the outer piston while the outer piston is in its second position, and wherein the first configuration is defined by the inner piston being in the first position, the second configuration is defined by the inner piston being in the second position, and the third configuration is defined by the inner piston being in the third position.

7. The apparatus of claim 5 wherein the first fluid chamber is enclosed by an inner surface of the hollow body and the second surface of the outer piston, the second fluid chamber is enclosed by the inner surface of the hollow body, the first surface of the outer piston, and the second surface of the piston head, and the third fluid chamber is enclosed by the first end of the hollow body and the first surface of the piston head, the hollow body further comprising a first access port, a second access port, and a third access port and the first, second, and third chambers each being in fluid communication respectively with the first, second, and third access ports;

wherein the inner piston can be moved between its first, second, and third positions by applying fluid to the first, second, and/or third access ports;

wherein the outer piston extends at least in part through both the first and second sections of the hollow body; and wherein the outer protrusion of the outer piston is further configured to define the second position of the outer piston by abutting the second end of the hollow body.

8. The apparatus of claim 7 wherein the hollow body further comprises a bearing arranged at the second end of the hollow body, and the outer protrusion of the outer piston is further configured to define the second position of the outer piston by abutting the bearing.

9. The apparatus of claim 7, wherein the control unit is coupled to and configured to control the one or more actuators to alternately move their respective inner piston into the first, second, and third positions, wherein the chamber assumes a first configuration when the respective inner piston of the one or more actuators is in the first position, the chamber assumes a second configuration when the respective inner piston of the one or more actuators is in the second position, and the chamber assumes a third configuration when the respective inner piston of the one or more actuators is in the third position;

wherein each of the one of more actuators is a linear actuator; and wherein the one or more actuators, when moving from one of said first, second and third configurations to another of said first, second and third configurations, are configured to cause on the first and second tools a relative translational movement of one of said tools with respect to the other.

10. The apparatus of claim 1, wherein the apparatus further comprises a conveyor configured for providing one or more products to the packaging station, and wherein the first distance is substantially zero, the second distance being greater than the first distance and allowing movement of the one or more products into a region between the first tool and the second tool, and the third distance being greater than the second distance.

11. The apparatus of claim 10, wherein the first tool comprises a table and the second tool comprises a chamber movably coupled to the support frame, the chamber having an open side that is, in the first configuration, substantially closed by contacting the table.

12. The apparatus of claim 1, wherein the apparatus further comprises a fluid distribution system operably coupled to the one or more actuators to provide a supply of the fluid to the one or more actuators and the control unit is operably coupled to the fluid distribution system and configured to control the supply of the fluid to the one or more actuators and maintain the one or more actuators in any one of said first configuration, second configuration and third configuration.

13. The apparatus of claim 5, wherein:
the apparatus further comprises a conveyor configured for providing one or more products to the packaging station, and wherein the first distance is substantially zero, the second distance being greater than the first distance and allowing movement of the one or more products into a region between the first tool and the second tool, and the third distance being greater than the second distance; and
the first tool comprises a table and the second tool comprises a chamber movably coupled to the support frame, the chamber having an open side that is, in the first configuration, substantially closed by contacting the table.

\* \* \* \* \*